(12) United States Patent  (10) Patent No.: US 9,327,876 B2
Garcia  (45) Date of Patent: *May 3, 2016

(54) REUSABLE BOTTLE CAP HAVING IDENTIFICATION MEANS

(71) Applicant: Daniel L. Garcia, San Diego, CA (US)

(72) Inventor: Daniel L. Garcia, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,233

(22) Filed: Dec. 4, 2014

(65) Prior Publication Data

US 2015/0083687 A1   Mar. 26, 2015

Related U.S. Application Data

(60) Continuation of application No. 14/321,726, filed on Jul. 1, 2014, now abandoned, which is a division of application No. 12/852,261, filed on Aug. 6, 2010, now Pat. No. 8,763,831.

(60) Provisional application No. 61/289,927, filed on Dec. 23, 2009.

(51) Int. Cl.
| | |
|---|---|
| *B65D 39/00* | (2006.01) |
| *B65D 39/04* | (2006.01) |
| *B65D 47/08* | (2006.01) |
| *B65D 47/12* | (2006.01) |

(52) U.S. Cl.
CPC ............ *B65D 39/0052* (2013.01); *B65D 39/00* (2013.01); *B65D 39/0023* (2013.01); *B65D 39/04* (2013.01); *B65D 47/0842* (2013.01); *B65D 47/12* (2013.01); *Y02W 30/807* (2015.05)

(58) Field of Classification Search
CPC .. B65D 39/0058; B65D 51/28; B65D 51/245; B65D 2203/00; B65D 39/0052; B65D 39/00; B65D 39/04; B65D 39/0023; B65D 47/12; B65D 47/0842; Y02W 30/807
USPC .......... 215/355, 364, 320, 306; 220/521, 523, 220/375; 40/311
See application file for complete search history.

(56) References Cited

U.S. PATENT DOCUMENTS

| | | | | |
|---|---|---|---|---|
| 1,832,806 | A * | 11/1931 | Dawson | 215/43 |
| 3,716,163 | A * | 2/1973 | Marcel | 215/320 |
| 4,776,972 | A * | 10/1988 | Barrett | B65D 51/28 206/216 |
| 5,165,003 | A * | 11/1992 | Carter | G02B 6/441 385/112 |
| 5,353,965 | A * | 10/1994 | Lee | 222/143 |
| 5,769,263 | A * | 6/1998 | Willingham | B65D 51/28 215/228 |
| 7,261,216 | B2 * | 8/2007 | Becker | 215/329 |

* cited by examiner

*Primary Examiner* — Fenn Mathew
*Assistant Examiner* — James N Smalley
(74) *Attorney, Agent, or Firm* — Charles F. Reidelbach, Jr., Esq.

(57) ABSTRACT

A reusable bottle cap system includes a bottle cap and a bottle cap cover. The bottle cap includes a stem portion extending downwardly from a flanged portion. When in use the stem portion is used to seal a bottle mouth. When the bottle cap is not in use the bottle cap cover encloses and houses the stem portion to protect it from debris. The flanged portion includes a complementary mating structure. The bottle cap cover includes a mating structure that engages the complementary mating structure to secure the bottle cap cover to the flanged portion. When the bottle cap cover is secured to the flanged portion the stem portion extends substantially to a closed bottom end of an inside surface of the bottle cap cover.

18 Claims, 9 Drawing Sheets

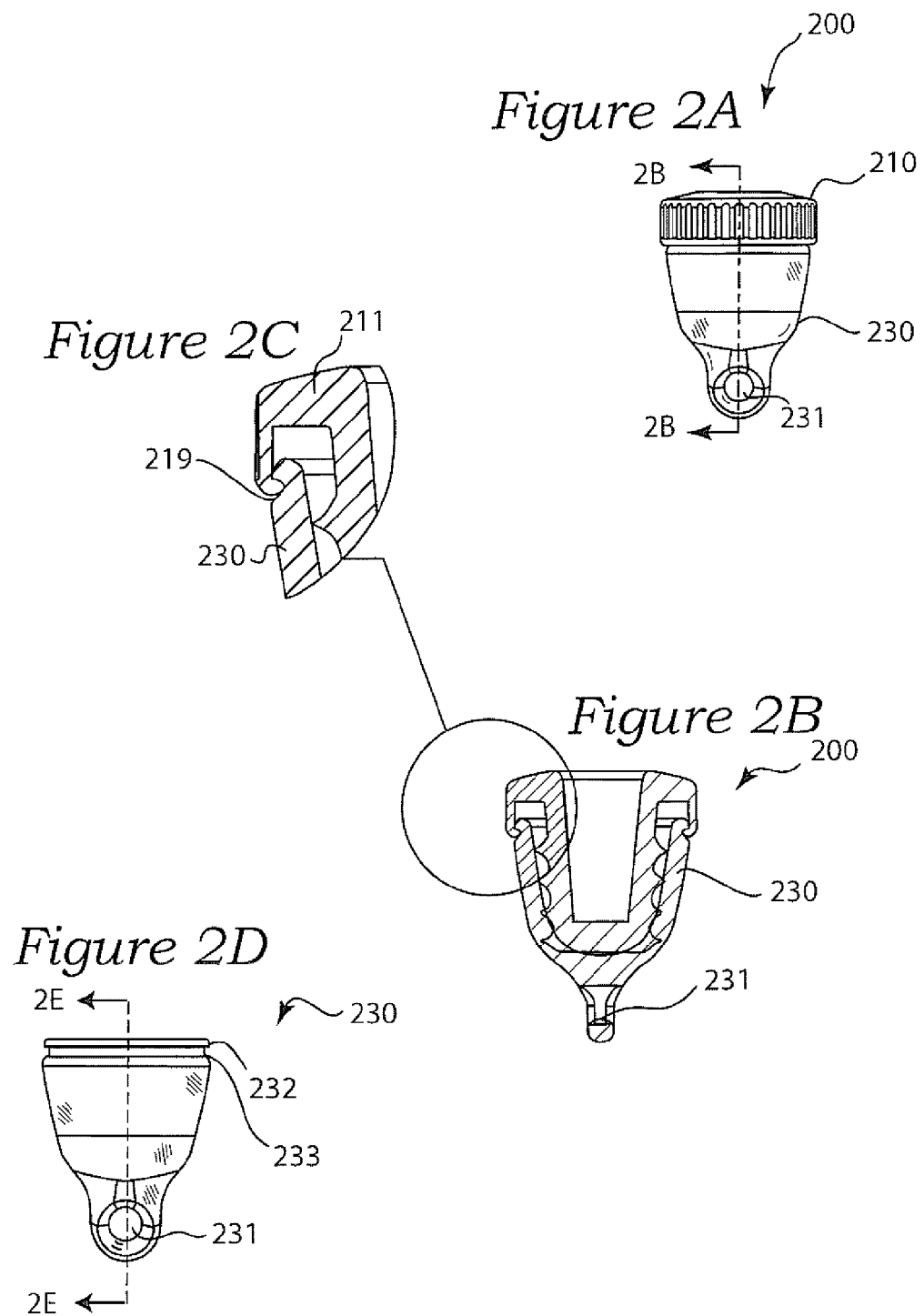

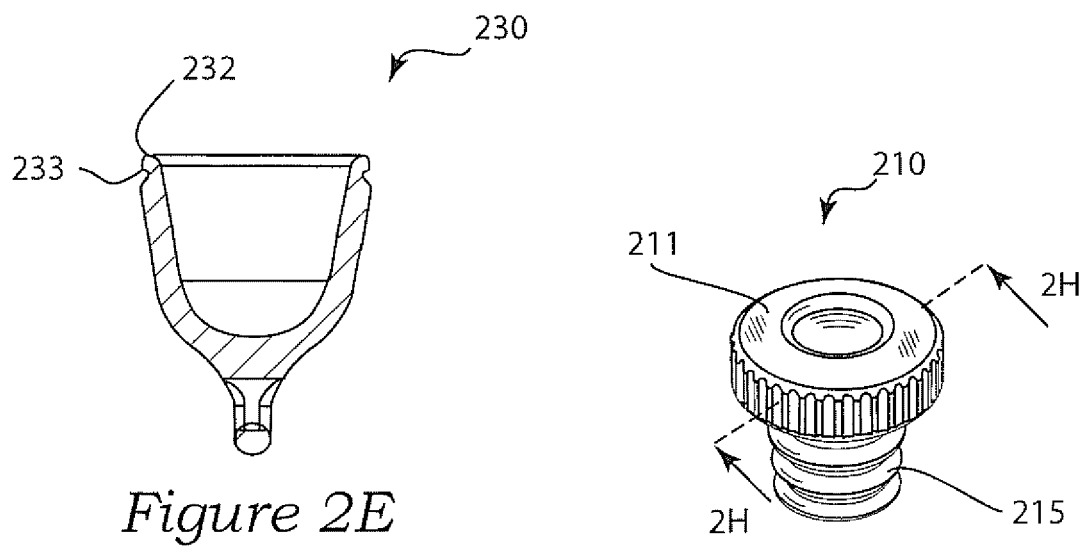
Figure 2E
Figure 2F
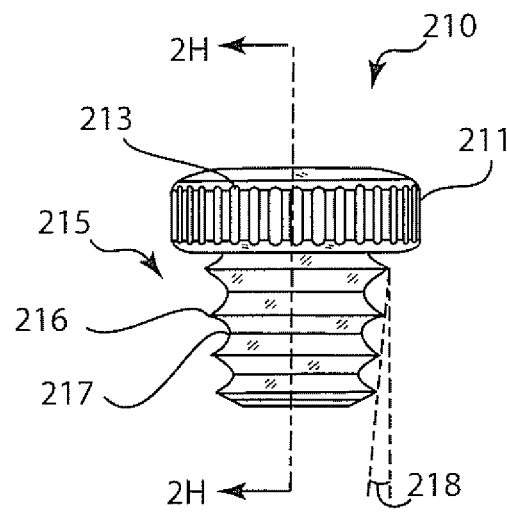
Figure 2G

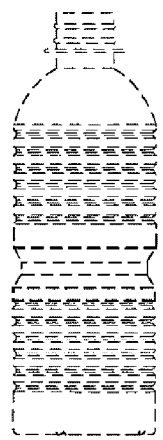
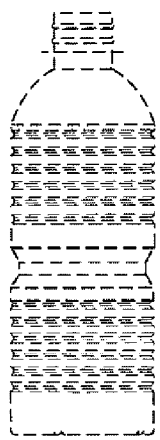
*Figure 6A*  *Figure 6B*
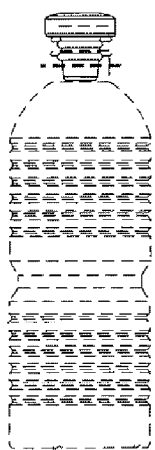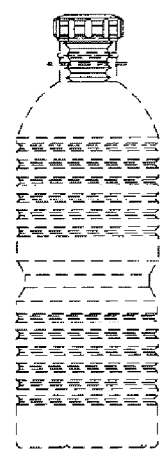
*Figure 6C*  *Figure 6D*  *Figure 6E*

REUSABLE BOTTLE CAP HAVING IDENTIFICATION MEANS

CROSS REFERENCE TO RELATED APPLICATIONS

This application is a continuation of U.S. patent application Ser. No. 14/321,726, filed on Jul. 1, 2014, which is a divisional U.S. patent application Ser. No. 12/852,261 filed on Aug. 6, 2010, now U.S. Pat. No. 8,763,831, which claims the benefit of Provisional Application Ser. No. 61/289,927, filed on Dec. 23, 2009, and which are incorporated by reference.

BACKGROUND OF THE INVENTION

1. Field of the Invention

The present invention pertains generally to methods of environmental preservation and saving of natural resources (specifically water), in addition to preserving manufactured and raw materials. More particularly, the invention relates to a reusable bottle cap device providing identification of own bottle to a user, minimizing or eliminating waste associated with any unused portions of the contents therein and encouraging reuse of disposable drinking bottles, especially water bottles.

2. Description of the Prior Art

Many reusable bottle caps have been introduced heretofore also employing identification means. One early example was proposed by Brixious and was granted U.S. patent protection in 1961, entitled "Identifying Device," U.S. Pat. No. 2,976,629.

According to Brixious, in bowling alleys, particularly during team play in league competition, spectators and players alike are present in large numbers. On such occasions, as well as similar gatherings, beverages such as soft drinks, beer and the like are purchased by both spectators and players who are constantly moving about, and during consumption thereof often set their drinks down at the most convenient location with the intention of returning thereto. Due to the large number of drinks that may be temporarily deposited in a relatively restricted area, and the fact that the players and spectators move about during the period of play, confusion as to the ownership of the various drinks often arises.

In more recent times, the dominant beverage consuming activity has become drinking water from bottles comprised of polyethylene or polyurethane plastic in such gatherings such as: company picnics, sporting events, hiking, camping, boating, industry and political conventions, trade shows, academic conferences, construction sites, professional groups, and a myriad of networking and social gatherings. The total bottled water consumption has grown vastly in our most recent history. According to the Bottled Water—Global Industry Guide, the market for bottled water grew by 7% in the year 2006 alone. Additionally, they provide a market forecast of an increase in consumption every year with a total increase of 51% by 2011 since the 2006 levels. This comes to approximately 174 billion liters of water consumed in a year from bottled water.

Accordingly, it is an object of the present invention to minimize the waste associated with beverage (especially water) drinkers losing track of a beverage (especially water) bottle after the contents have been only partially or marginally consumed. Also, the practice of washing, rinsing, and reusing beverage (especially water) bottles is increasing in practice. Hence, it is an additional object of the present invention to promote this practice and therefore reduce non-biodegradable landfill waste and raw material consumption.

Not surprisingly, more recent efforts to gain patent protection on beverage identification means have emerged. Two such examples are U.S. Pat. No. 6,745,505, entitled "Color Coded Beverage Cap Collection with Permanent Passive Indicia Indicating Beverage Bottle User Identities," to Moran; and U.S. Pub. Pat. App. No. 2009/0026104, entitled "Bottle-Cap Identification System," disclosed by Cassidy. It is an objective of the present invention to provide a novel alternative design to those that have been proposed in the prior art that can be can be configured to different beverage (especially water) bottles having varied thread configurations and varied diameter openings at the top, through which the contents are delivered. It is further an object of the present invention to provide a design that may be inexpensively cast to a mold and mass produced and therefore comparatively cost effective. It is still further an object of the present invention to provide a bottle cap cover to protect the bottle cap from dirt and debris while not in use, thereby maintaining hygiene and thus maximizing the usable life of the present invention. It is still further noted that the present invention will be sufficiently sturdy to withstand repeated washings, thereby encouraging multiple uses.

BRIEF SUMMARY OF THE INVENTION

The present invention specifically addresses and alleviates the above mentioned deficiencies associated with the prior art. More particularly, the present invention, in a first aspect is directed to a reusable bottle cap system (bottle plus cover) comprising: a bottle cap portion comprising: a stem portion about a vertical axis; and a flanged ring portion about an upper end of the stem portion, wherein the stem portion further comprises a plurality of successive U-shaped grooves along a length thereof, the U-shaped grooves forming a crest and a trough, the crest between two adjacent troughs forming a point.

The reusable bottle cap system is further characterized wherein the plurality of successive U-shaped grooves are aligned perpendicular to the vertical axis. The invention in this aspect is additionally characterized in that the flanged ring portion comprises an outside surface that extends outwardly and downward smoothly and continuously to form a rounded ring from a lateral side to a top surface. Still further the invention is characterized wherein the lateral side comprises a lip that extends inward toward the stem portion. The stem also comprises a slight taper.

Furthermore, the reusable bottle cap system of this invention aspect is characterized wherein the stem is hollow throughout its length from a top end to a bottom end, further except wherein a hollow stem is closed at the bottom end. Also, stem may be hollow throughout its length from a top end to a bottom end; or alternatively hollow except that it is closed at either a top end or a bottom end.

The reusable bottle cap system herein is further characterized as comprising a bottle cap cover to house and enclose the stem portion, the bottle cap cover further comprising: a crown at a top end thereof; a mid-portion comprising a surface having a convex shape; and a mouth having a lip wherein the lip comprises a groove, the groove configured to mate with complementary structure of the bottle cap, wherein the bottle cap cover is designed to keep the bottle cap free from dirt and debris when not in use.

The cover to the bottle cap is also characterized as comprising an eyelet protruding from the crown, the eyelet designed to link to a key chain of a user. Alternatively, the eyelet protrudes from the mid-portion of the cover.

In a second aspect, the invention is characterized as a reusable bottle cap comprising: a stem portion about a vertical axis; and a flanged ring portion about an upper end of the stem portion, wherein the stem portion further comprises a two semi-circular grooves along a length thereof, the semi-circular grooves configured to receive two O-rings. The invention in this aspect is characterized wherein the flanged ring portion comprises a plurality of lengthwise ridges, the ridges designed to improve grasping of the bottle cap.

The invention is additionally characterized in that the flanged ring portion further comprises a top portion, the top portion having a circular recess configured to receive a marker of the present invention. The flanged ring portion also has a lateral side, the lateral side having a lip protruding inward toward the stem portion, the lip configured to mate with complementary structure on a bottle cap cover. The invention is also characterized wherein the stem is hollow throughout its length from a top end to a bottom end, wherein a hollow portion in the stem is further tapered from a top end to a bottom end. The reusable bottle cap in this aspect further comprises polyethylene or polyurethane material, the polyethylene or polyurethane material being pliable to allow for compression of the cap to form an effective seal to the mouths of bottles of varying diameter.

In yet another aspect, the invention is characterized as reusable bottle cap comprising: a stem portion about a vertical axis; and a flanged ring portion about an upper end of the stem portion, wherein the flanged ring portion further comprises a top portion and a lateral side, wherein the lateral side extends downward and outward from the top portion at a substantially constant negative slope, and wherein the top portion comprises a circular recess configured to receive a circular identification marker. The invention in this aspect is further characterized wherein the recess further comprises a lip around a rim thereof, and wherein the recess further comprises a plurality of cavities to receive a plurality of pins configured to the circular identification marker.

Additionally in this aspect, the stem further comprises a cylindrical base having a plurality of radial ridges protruding therefrom, wherein at an area where the ridges meet with the cylindrical base is devoid of a smooth and continuous transition. Also in this embodiment, the stem portion is hollow throughout its length from a top end to a bottom end, further except wherein a hollow stem is closed at the top end.

In still another aspect, the invention is characterized as a bottle cap cover to house and enclose a bottle cap stem portion, the bottle cap cover comprising: a crown at a top end thereof; a mid-portion; and a mouth having a lip wherein the lip comprises a groove, the groove configured to mate with complementary structure of the bottle cap, wherein the bottle cap cover is designed to keep the bottle cap free from dirt and debris when not in use.

The cover is further characterized wherein the mid-portion comprises a surface having a convex shape. Also, the cover further comprises an eyelet protruding from the crown, the eyelet designed to link to a key chain of a user. Alternatively, the eyelet protrudes from the mid-portion.

In yet still another aspect, the invention is a reusable bottle cap comprising: a stem portion about a vertical axis; and a flanged ring portion about an upper end of the stem portion, the flanged ring portion having an opening at a top end configured to receive an identification marker, the identification marker coupled to the flanged ring portion top end via a living hinge.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2A is a profile view of a second preferred bottle cap system of the present invention;

FIG. 2B illustrates a cross-sectional view taken along sectional line 2B-2B in FIG. 2A;

FIG. 2C illustrates an enlarged view of an area as identified in FIG. 2B;

FIG. 2D is a profile view of a first preferred bottle cap cover;

FIG. 2E illustrates a cross-sectional view of the bottle cap cover of present invention taken along sectional line 2E-2E in FIG. 2D;

FIG. 2F is a perspective view of the second preferred bottle cap embodiment illustrated of the present invention;

FIG. 2G illustrates a profile view of the second preferred reusable bottle cap;

FIGS. 6A through 6E illustrate how the present invention may be applicable to a variety of beverage (especially water) bottle designs;

DETAILED DESCRIPTION OF PREFERRED EMBODIMENTS

Figure 1A:
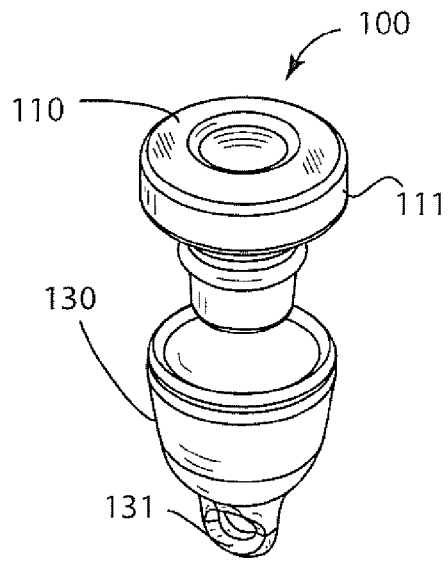
FIG. 1A is a perspective illustration of a first preferred embodiment of the present invention with a corresponding bottle cap cover.

With reference to FIG. 1A, a first preferred reusable bottle cap 110 system 100 of the present invention is illustrated in perspective. The upper portion of the drawing shows a reusable bottle cap 110 while the lower portion comprises a bottle cap 130 cover to protect the cap 100 from dirt and debris while not in use. The cap cover may further include an eyelet 131 for connecting to a key chain of a user as desired.

Figure 1B:
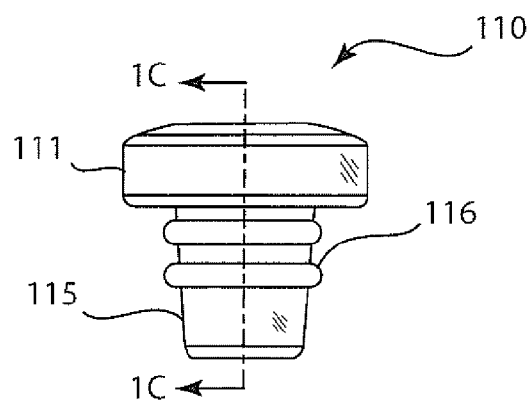
FIG. 1B is a profile view of the invention embodiment illustrated in FIG. 1A.
Figure 1C:
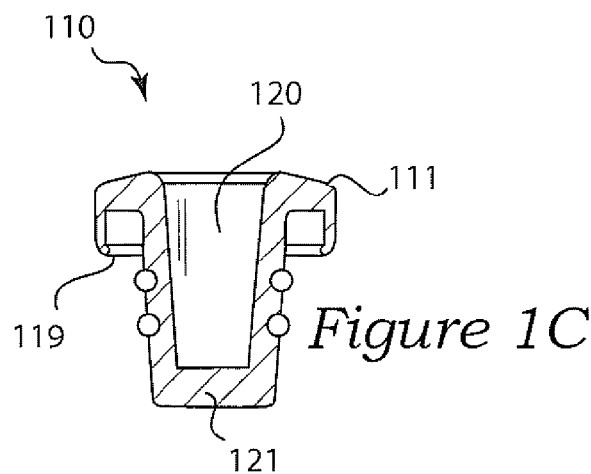
FIG. 1C illustrates a cross-sectional view taken along sectional line 1C-1C in FIG. 1B.

With regard to FIG. 1B and FIG. 1C, profile and sectional views of the first preferred bottle cap 110 are illustrated respectively. The cap 110 generally includes a stern portion 115 and a flanged ring portion 111 about an upper end of the stem portion 115. The stem 115 is configured to mate with an inner rim of a beverage (especially water) bottle opening, as shown in FIG. 5 and FIG. 6A through FIG. 6E. The stem portion 115 is additionally characterized in that it is hollow 120 through its length except that its bottom end is closed 121 (FIG. 1C). In this and in other embodiments, the stem further has a slight taper 218 (FIG. 2G) from top to bottom 121 to fit the inner rim of the mouth of beverage (especially water) bottles of varying inner diameters (FIGS. 5 and 6A through 6E). This particular stem embodiment 115 comprises two grooves machined around a circumference thereof; the grooves are additionally configured to receive two O-rings 116 wherein the O-rings assist in forming a seal in the top opening of a beverage (especially water) bottle (FIG. 6B).

Also referring to FIG. 1A through FIG. 1C, a flanged ring portion 111 of the bottle cap 110 generally extends outwardly from the upper stem and then extends downward to surround an upper rim of a bottle cap opening. A lateral side of the ring 111 extends slightly inward forming a lip 119. This lip 119 is configured to be received by the bottle cap cover 130, 230 similar to the embodiment shown in FIG. 2A through FIG. 2C. It is additionally contemplated herein that the bottle cap 110, 210, 310, 410, 510, 710, 810, 910 may be comprised of polyethylene or polyurethane material of sufficient pliability to allow for compression of the cap to form an effective (i.e., watertight) seal to the mouths of bottles of varying inner diameter. Also in a preferred embodiment, the bottle caps 110, 210, 310, 410, 510, 710, 810 and covers 130, 230, 430, 730 herein are comprised of biodegradable plastic and can be configured to soda bottles or beer bottles etc.

Referring to FIG. 2A through FIG. 2C, a second preferred reusable bottle cap system 200 is illustrated. This embodiment includes ridges 213 along a lateral side of the flanged ring portion 211. The ridges 213 may be useful to aid in grasping of the bottle cap 210 by a user. Further, the stem portion comprises successive U-shaped grooves 216, 217 along its length; the U-shaped grooves being directly adjacent to one another forming a crest 216 and a trough 217; the crest 216 between two adjacent troughs 217 forming a point 216.

Further to FIG. 2A and FIG. 2B, the bottle cap 210 is illustrated coupled to a bottle cap cover 230 for storage of the bottle cap when not in use. The cover 230 may optionally include an eyelet 231 so that the cover 230 and bottle cap 210 together may be conveniently carried on a key chain. The cover 230 is generally bell shaped, but could also be conical in shape, or barrel shaped 430, 730.

With regard to FIG. 2C, an enlarged view of a lip portion 219 of the bottle cap ring mating with a groove 233 of a rim 232 of the bottle cap cover is illustrated (FIG. 2D and FIG. 2E). As stated, the lip portion 219 extends inward slightly to form a complementary union with the rim 232 and groove 233 encircling the outer circumference of the open end of the cover 230. The mating is sized and configured such that the two pieces 210, 230 can snap together with a minimal amount of force. It is further contemplated herein that a bottle cap 210 and cover 230 comprised of different colors would serve a purpose of identification.

Figure 2H:
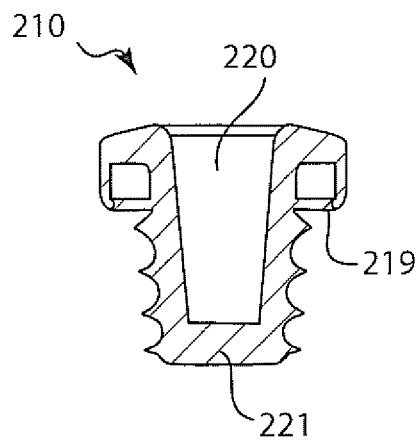
FIG. 2H illustrates a cross-sectional view taken along sectional line 2H-2H in FIG. 2F and again in FIG. 2G.
Figure 8:
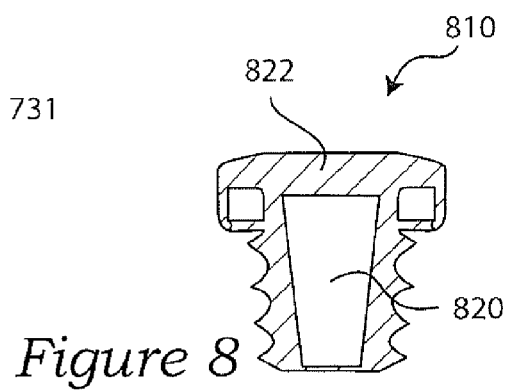
FIG. 8 is a sectional view of a variation of the embodiment illustrated in FIG. 2H.

Referring to FIG. 2H, the bottle cap 210 herein may have a hollow 220 stem 215, however closed 221 at a bottom end. Alternatively with reference to FIG. 8, the bottle cap 810 hollow 820 stem may be closed 822 at a top end.

Figure 3A:
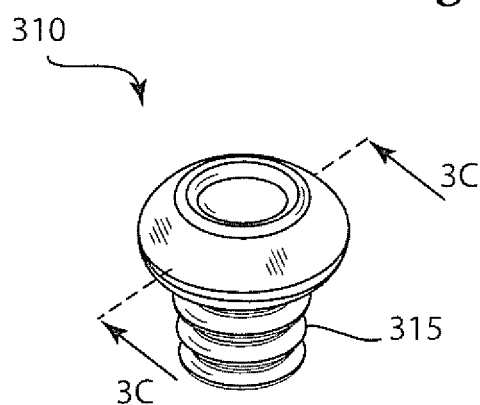
FIG. 3A is a perspective illustration of a third preferred reusable bottle cap of the present invention.
Figure 3B:
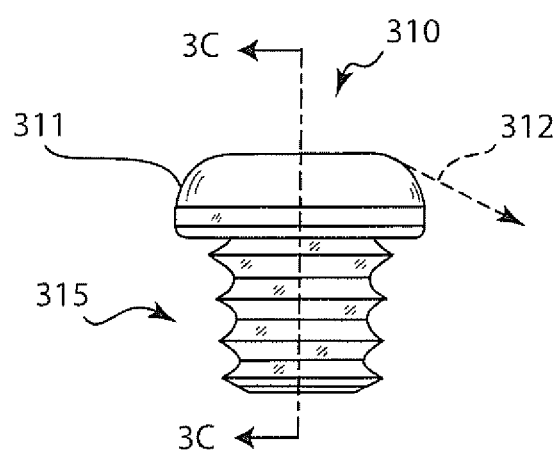
FIG. 3B is a profile view of the invention embodiment illustrated in FIG. 3A.
Figure 3C:
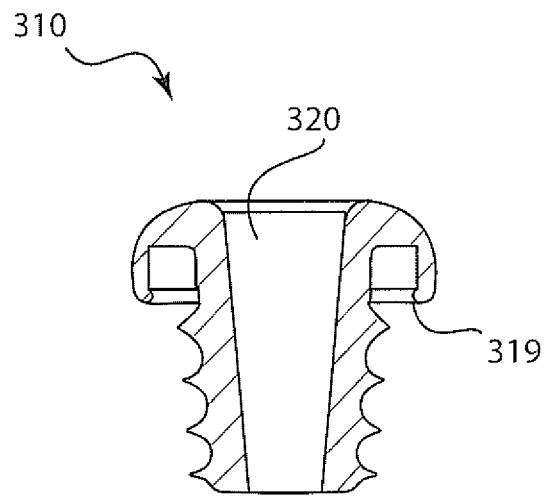
FIG. 3C illustrates a cross-sectional view taken along sectional line 3C-3C in FIG. 3A and again in FIG. 3B.

FIG. 3A illustrates a perspective view of a third preferred bottle cap 310 embodiment of the present invention; FIG. 3B is a profile view of the third preferred embodiment 310; and FIG. 3C illustrates a cross-sectional view taken along sectional line 3C-3C. In this embodiment, the flanged ring portion 311 has an outside surface that extends outwardly and downwardly smoothly and continuously to form a rounded ring from lateral side to a top surface. Stated differently, the flanged ring portion 311 has a surface having a slope 312, the slope is continuously increasing and negative from a top to a lateral side without a step change in slope 312. Further, the flanged ring portion 311 is configured to fit around mouths of bottles of varying outer diameter. Additionally, the stem 315 is hollow 320 throughout its vertical axis through which a user may dispense of the contents or so that a straw would be permitted to fit through the stern 315.

Figure 4:
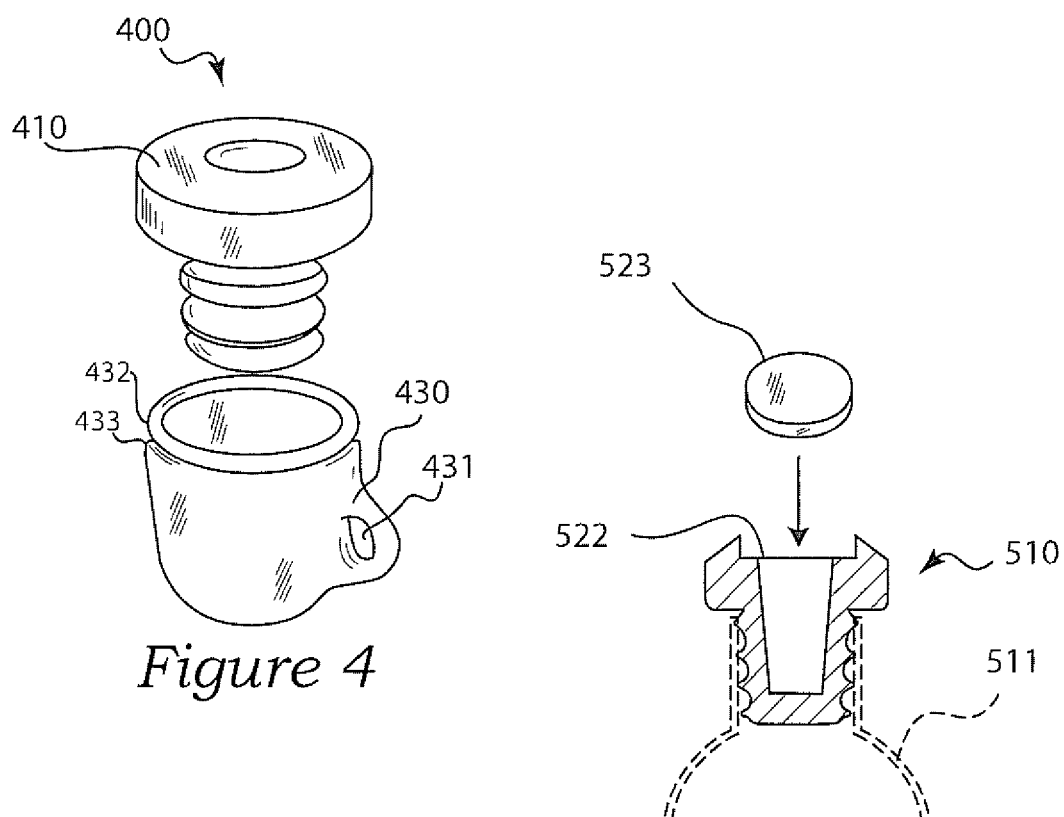
FIG. 4 is a perspective illustration of another preferred bottle cap system of the present invention.

FIG. 4 illustrates yet another reusable bottle cap system 400 comprising bottle cap 410 and cover 430. It should be readily appreciated that many cap embodiments 110, 210, 310, 410, 510, 710, 810, 910 could be coupled to different cover embodiments 130, 230, 430. FIG. 4 is further illustrative of a bottle cap cover 430 having an eyelet 431 on a side thereof. In this configuration, the cover 430 is generally in the shape of a tea cup having a flat bottom end continuously curving to an open upper end comprising a rim 432 and groove 433.

Figure 5:
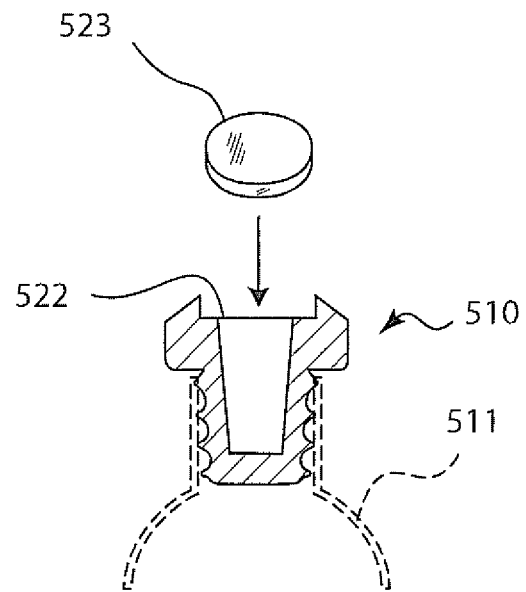
FIG. 5 is a schematical illustration of another preferred embodiment employing a marker as identification means.

With regard to FIG. 5, a schematic illustration of yet another invention embodiment is shown. In this variation, the bottle cap top comprises a circular recess 522 to receive a color coded or labeled marker 523. This labeling may further comprise one or more of the following: an individual's name/initials/monogram; a company name/moniker/emblem and/or contact information and/or website and/or social networking page (e.g. MySpace, Facebook, Twitter, etc.) and/or logo; any or all of the same information for a sports team, a musical artist/band, or a fictional/real character. The recess 522 is sized such that the marker 523 will fit snugly thereto. Further, a relief may be provided to the recess 522 to assist a user in removing the marker 523.

With reference to FIG. 6A to FIG. 6E, a manner in which the bottle cap 110, 210, 310, 410, 510, 710, 810, 910 can mate to the inside of the opening of a beverage (especially water) bottle is illustrated with various examples. Since the bottle cap contains a slight taper 218, it can mate with a variety of water bottles available at retail having a slightly different size opening. Also, the invention will fit a water bottle regardless of the thread configuration on the outer part of the opening.

Figure 7A:
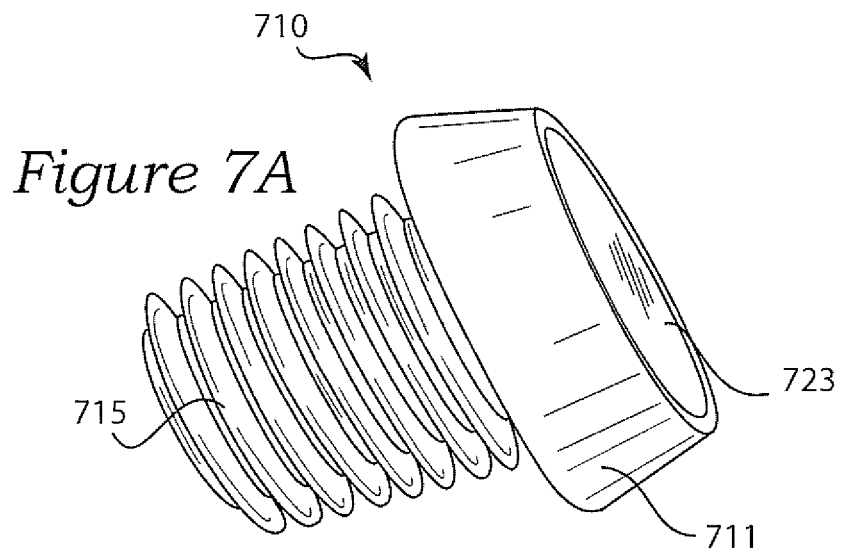
FIG. 7A illustrates a perspective view of an additional bottle cap embodiment from an above vantage point.
Figure 7B:
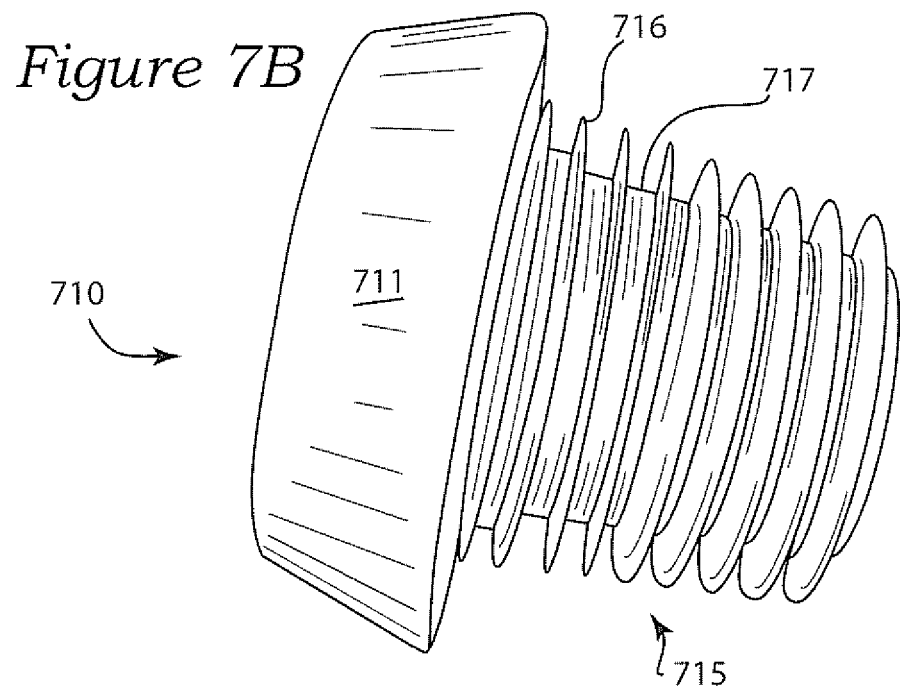
FIG. 7B illustrates a perspective view of the bottle cap embodiment from a side vantage point.

Now turning to FIG. 7A through FIG. 7E, another preferred embodiment of the present invention is illustrated and generally comprises reusable bottle cap 710 with a cover 730 thereto. FIG. 7A more specifically illustrates an identification marker 723 coupled to a flanged ring portion 711. Close inspection of FIG. 7A and FIG. 7B reveals that the stem portion 715 comprises different structure than in previous embodiment. More particularly, the stem 715 has a cylindrical base 717 and therefore the surface between adjacent peaks 716 is substantially flat. The peaks 716 themselves are additionally different than previous embodiment in that they protrude outward with a slight convex surface; whereas the previous embodiment 215 comprises a concave surface 217 to a peak 216 also comprising a point 216, 716. Additionally, since the peaks 716 comprise a surface that is slightly convex, then also the peaks 716 are not flat or thin like a wafer.

Figure 7C:
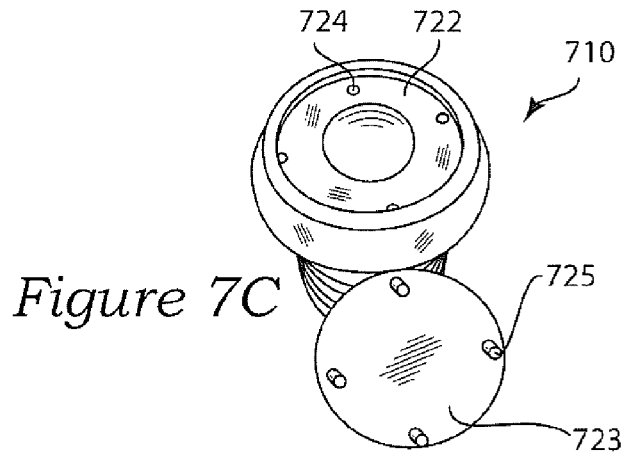
FIG. 7C is a perspective view of the reusable bottle cap embodiment with an identification marker removed.
Figure 7D:
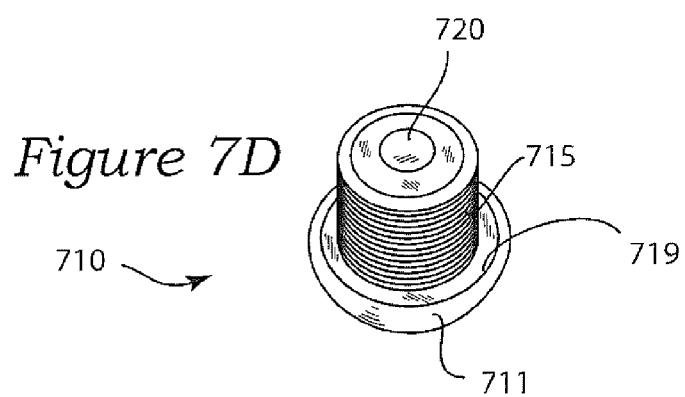
FIG. 7D is an additional perspective view of the reusable bottle cap from an underneath vantage point.
Figure 7E:
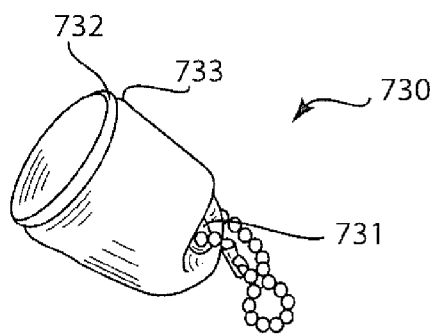
FIG. 7E is a perspective view of an additional bottle cap cover embodiment.

With reference to FIG. 7C, a perspective view of the reusable bottle cap embodiment with an identification marker 723 removed is shown. Identification marker 723 is configured to be received by a recess 722 carved out of the flanged ring portion 711. More specifically, the marker 723 comprises a plurality of pins 725 configured to be received by a respective plurality of cavities 724. With regard to FIG. 7D, the flanged ring portion 711 and stem 715 are hollow 720 so that into which a straw could fit if the marker 723 was removed. As with other embodiments, the underside of the flanged ring portion 711 has a lip 719 configured to connect to a lip 732 and groove 733 of a bottle cap cover 730 (FIG. 7E). In this embodiment 730, the bottle cap cover 730 is barrel shaped and not bell shaped 230 or cone shaped. The barrel shape 730 in this modification will result in more usable surface area to affix a logo or a design thereto. The embodiment similarly comprises an eyelet 731. It is still further contemplated that marker 523, 723 and/or bottle cap 110, 210, 310, 410, 510, 710, 810, 910 may comprise cold-activated material, in which a temperature change will cause a chemical within the material to change color, further providing identification means of own bottle (FIG. 6A through FIG. 6E).

Figure 9:
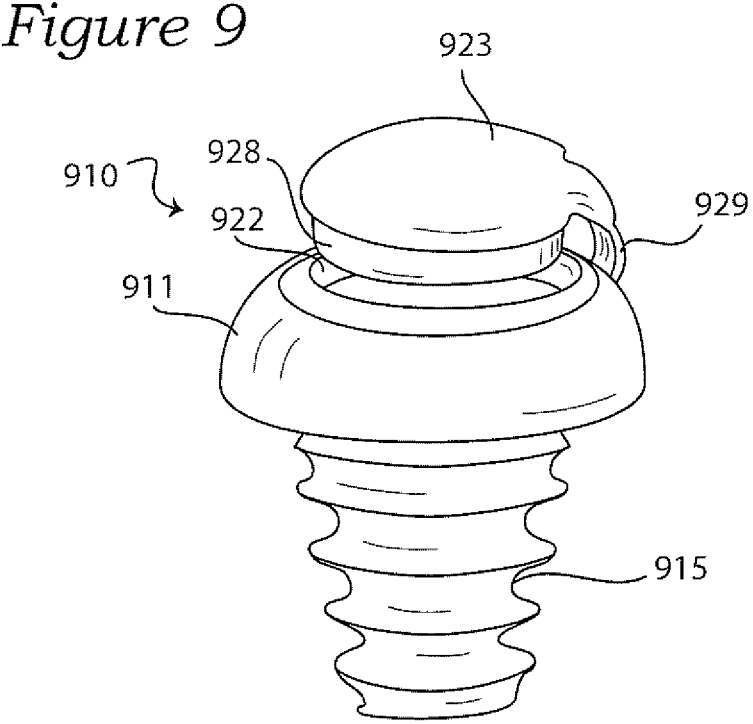
FIG. 9 is a perspective view of a living hinge embodiment applicable to an identification marker.

With regard to FIG. 9, an alternative embodiment that has an identification marker 923 coupled to a bottle cap 910 with a living hinge 929. The living hinge comprises a thin, narrow plastic material that is able to pivot forming a hinge. Stem 915 is illustrated as an example and could be replaced with other stem designs of the present invention. It is further contemplated that identification marker 923 could act as a lid to the bottle cap 910, so that the cap 910 itself would not have to be removed to expel bottle contents. Marker 923 further comprises a vertical surface 928 to mate with a vertical surface 922 on flanged ring portion 911.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular Reusable Bottle Cap Having Identification Means as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What I claim is:

1. A reusable bottle cap system comprising:
   a bottle cap including:
   a stem portion extending along an axis from an upper end of the stem portion to a lower end of the stem portion, the stem portion configured to mate with a beverage bottle opening whereby the stem portion extends into and thereby seals the bottle opening, the stem portion including a plurality of successive raised ridges for sealing the beverage bottle opening; and
   a flanged portion extending laterally from the upper end of the stem portion, the flanged portion including a lateral side and a complementary mating structure; and
   a bottle cap cover including a mating structure that engages with the complementary mating structure of the flanged portion of the bottle cap whereby the bottle cap cover encloses and houses the stem portion to protect the stem portion from debris when the bottle cap is not in use and whereby the bottle cap cover defines an inside surface that extends downwardly from a top end to a closed bottom end of the inside surface, the stem portion substantially extends to the closed bottom end of the inside surface.

2. The reusable bottle cap system of claim 1 wherein the stem portion tapers from the upper end toward the lower end.

3. The reusable bottle cap system of claim 1 wherein the mating structure and complementary mating structure couple by snapping together.

4. The reusable bottle cap system of claim 1 wherein the complementary mating structure couples to an outer circumference of an open end of the bottle cap cover.

5. The reusable bottle cap system of claim 1 wherein the complementary mating structure includes a lip that extends inwardly toward the stem portion.

6. The reusable bottle cap system of claim 5 wherein the mating structure defines a groove that receives the lip when the bottle cap cover is placed over the stem portion.

7. The reusable bottle cap system of claim 1 wherein the bottle cap cover includes a crown, mid-portion, and a mouth portion whereby the stem portion is received into the mouth portion, the mouth portion includes the mating structure that engages with the complementary mating structure.

8. The reusable bottle cap system of claim 7 wherein the crown defines an eyelet for carrying the reusable bottle cap system when the reusable bottle cap is not in use.

9. The reusable bottle cap system of claim 7 wherein the mid-portion of the bottle cap cover has a concave outer shape.

10. The reusable bottle cap system of claim 1 wherein the bottle cap cover has one of a generally bell shape, a generally barrel shape, and a generally conical shape.

11. A reusable bottle cap system comprising:
    a bottle cap cover including a crown, a mid-portion, and a mouth, the mouth defining a mating structure; and
    a bottle cap including a stem portion and a flanged portion, the stem portion extending along an axis from an upper end of the stem portion to a lower end of the stem portion, the stem portion configured to be received into an opening of a beverage bottle to thereby seal the beverage bottle the stem portion tapering continuously from the upper end of the stem portion to the lower end of the stem portion; and
    the flanged portion extending from the upper end of the stem portion, the flanged portion including a lateral side that defines a complementary mating structure whereby when the stem portion is fully received into the mouth, the mating structure couples to the complementary mating structure and the bottle cap cover houses, encloses, and protects the stem portion from debris when the reusable bottle cap is not in use and whereby the bottle cap cover defines an inside surface that extends downwardly from a top end to a closed bottom end of the inside surface, the stem portion substantially extends to the closed bottom end of the inside surface.

12. The reusable bottle cap of claim 11 wherein the stem includes one of O-rings, raised ridges, and raised peaks for sealing to a mouth of the beverage bottle.

13. The reusable bottle cap of claim 11 wherein the stem is hollow throughout its vertical axis to allow a user to dispense contents through the cap during use.

14. The reusable bottle cap of claim 11 wherein the flanged portion includes a top surface defining a recess for receiving a marker.

15. The reusable bottle cap of claim 11 wherein the complementary mating structure includes a lip that extends inwardly toward the stem portion.

16. A bottle cap system comprising a reusable bottle cap and a bottle cap cover, the reusable bottle cap including a stem portion extending along an axis from an upper end to a lower end and closed at the lower end and a flanged portion extending from the upper end of the stem portion including a lateral side that defines a complementary mating structure, the bottle cap cover further comprising:

a crown;

a mid-portion; and a mouth portion defining a mating structure that couples to the complementary mating structure when the stem portion is received into the mouth portion whereby the bottle cap cover protects the stem portion from debris when the reusable bottle cap is not in use and whereby the bottle cap cover defines an inside surface that extends downwardly from a top end to a closed bottom end of the inside surface, the stem portion substantially extends to the closed bottom end of the inside surface.

17. The bottle cap cover of claim 16 wherein the crown defines an eyelet for carrying the bottle cap cover and the reusable bottle cap when the reusable bottle cap is not in use.

18. The bottle cap cover of claim 16 wherein the bottle cap cover has one of a generally bell shape, a generally barrel shape, and a generally conical shape.

* * * * *